Feb. 3, 1925.

Re. 15,992

L. WILPUTTE

COKE OVEN DECARBONIZATION

Original Filed May 14, 1921 3 Sheets-Sheet 1

INVENTOR
LOUIS WILPUTTE

BY
John E. Hubbell
ATTORNEY

Feb. 3, 1925. Re. 15,992
L. WILPUTTE
COKE OVEN DECARBONIZATION
Original Filed May 14, 1921 3 Sheets-Sheet 2
Fig. 3,
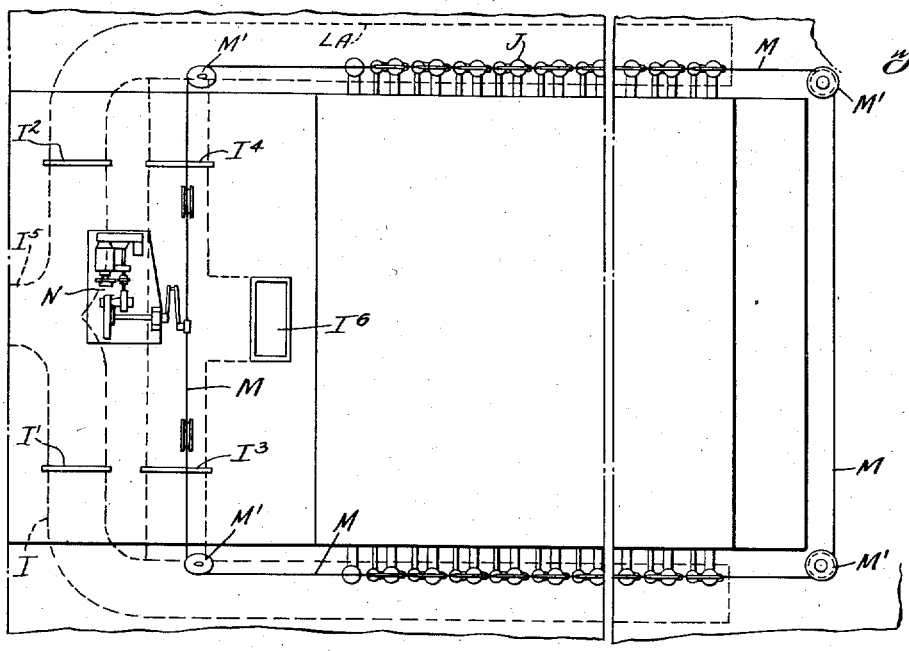
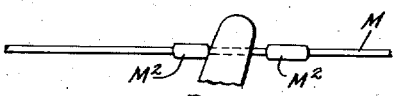
Fig. 4,
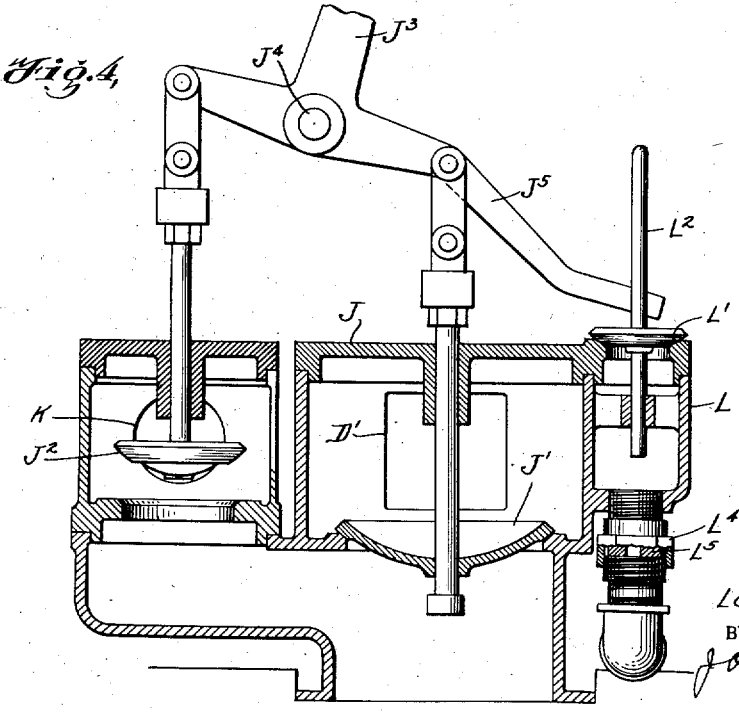
INVENTOR
LOUIS WILPUTTE
BY
John E. Hubbell
ATTORNEY Feb. 3, 1925.

Re. 15,992

L. WILPUTTE

COKE OVEN DECARBONIZATION

Original Filed May 14, 1921

3 Sheets-Sheet 3

INVENTOR

LOUIS WILPUTTE

BY

John E. Hubbell

ATTORNEY

Reissued Feb. 3, 1925. Re. 15,992

UNITED STATES PATENT OFFICE.

LOUIS WILPUTTE, OF NEW ROCHELLE, NEW YORK, ASSIGNOR OF TWO-THIRDS TO ALICE A. WILPUTTE, OF NEW ROCHELLE, NEW YORK.

COKE-OVEN DECARBONIZATION.

Original No. 1,435,361, dated November 14, 1922, Serial No. 469,506, filed May 14, 1921. Application for reissue filed October 10, 1924. Serial No. 742,923.

*To all whom it may concern:*

Be it known that I, LOUIS WILPUTTE, a citizen of the United States, and resident of New Rochelle, Westchester County, and State of New York, have invented certain new and useful Improvements in Coke-Oven Decarbonization, of which the following is a specification.

My present invention consists in an improved method of, and apparatus for eliminating carbon deposits from the fuel gas supply channels of coke ovens, and was primarily devised and is especially adapted for use in regenerative coke ovens having vertical heating flues.

In the general type of by-product regenerative coke ovens in most extensive use in this country, the heating walls between the coking chambers are provided with a series of vertical flues which receive combustible gas at their lower ends through channels extending horizontally into the oven structure from the opposite sides of the battery to the flow reversal plane located approximately midway between the sides of the battery. Each of these gas supply channels in an oven of the ordinary dimensions, is in the neighborhood of eighteen to twenty feet in length, and supplies fuel gas to the various vertical heating flues in the corresponding portion of the heating wall. Ordinarily something like twelve to sixteen vertical heating flues are supplied with gas from each gas channel each flue being connected to the appropriate gas supply channel by an individual passage including a gas measuring nozzle of refractory earthenware.

The gas channels are located in brickwork wall portions of the oven structure, which are highly heated, and the gas passing to the vertical heating flues adjacent the center of the battery is thus highly heated, while the gas passing to the flues adjacent the sides of the battery is less highly heated because the cooling effect of the gas flowing through the channels is more pronounced in the outer portions of the channels than in the inner end portions. The high temperature to which the fuel gas is thus subjected tends to "crack" its hydro-carbon constitutents with a resultant deposit of solid carbon on the walls of the horizontal gas supply channels and the passages connecting the channels to the vertical flues. This carbon is especially objectionable in the gas nozzle orifices as any carbon deposition there correspondingly varies the amount of gas which the orifice will pass, and moreover, these orifices, which ordinarily run from three-eighths to three-fourths of an inch in diameter, are so small that a relatively small amount of carbon deposition is sufficient to wholly or largely close them.

The trouble caused by carbon deposition is of such a serious character that it is regular operating practice to provide men whose sole or principal duty it is to punch carbon out of the nozzle orifices and to replace nozzles broken in this punching out operation. To punch the carbon out of the nozzles is a difficult and arduous operation since it must be done from the top of the oven structure by means of iron bars inserted through apertures left for the purpose in the upper portion of the oven structure. The temperatures to which these bars are subjected are so high that the bars lose their normal rigidity after a few seconds' use, and considerable skill is required to enable the operator to insert the end of the bar into the eye of a nozzle located a dozen feet or so beneath his feet when the bar itself is highly flexible and the nozzle and the walls of the flues into which he must look are white hot. In consequence nozzles are broken with considerable frequency in the punching out operation.

In ordinary regenerative coke ovens, gas is supplied through each gas supply channel intermittently. To minimize the troubles due to carbon deposition provision has been made in the past to feed air into each horizontal gas supply channel during a portion or all of the time in which that channel is not passing gas to the vertical heating flues. The air thus supplied tends to burn out the carbon previously deposited in the gas channels, passages, and nozzles. In general, however, heretofore it has not been found possible to avoid the necessity for constant supervision and more or less frequent nozzle punching operations by feeding air into the gas channels, owing, primarily, I believe, to the fact that heretofore the decarbonizing air has been supplied to the gas channels at the outer ends of the latter.

In accordance with the present invention, I supply decarbonizing air to the inner ends of the gas supply channels and thereby assure an adequate supply of decarbonizing air to the nozzles adjacent the center of the battery where the carbon deposition is the heaviest. When the air is supplied to the outer ends of the gas channels, the resistance to the flow through the channels, and the decreased density (due to its higher temperature) of the air reaching the inner nozzles as compared with the density of the air reaching the outer nozzles makes it practically impossible to get sufficient air into the channels for decarbonizing the inner nozzles, particularly when the flow capacity of the inner nozzle is obstructed more or less by carbon deposition, without introducing more air into the outer ends of the gas channels than is desirable. Only a relatively small amount of decarbonizing air can be introduced into the outer ends of the horizontal channels without an objectionable cooling effect on the walls of the gas channels, and the cracking of the bricks forming the channel walls as a result of their contraction and expansion under the temperature variations to which they are thus subjected.

In the practical carrying out of my invention I supply air to the inner ends of the gas supply channel through special channels formed in the oven structure, and preferably utilize the same reversing mechanism by which the flow through the regenerator and heating flues is reversed at regular intervals to start and stop the flow of air through the special air supply channels at the proper intervals. The air supply channels preferably include portions extending from the sides of the battery nearly to the center of the battery which are located in portions of the battery structure much less highly heated than are the walls of the gas supply channels. In consequence of the length and disposition of the air supply channels, the decarbonizing air heats up gradually in its passage from the outside of the battery to the inner ends of the gas channels and does not come in contact with highly heated portions of the oven brick work until it is quite highly heated. I thus avoid subjecting highly heated portions of the oven brick work to the undesirable cooling effect of comparatively cold air.

The various features of novelty which characterize my invention are pointed out with particularity in the claims annexed to and forming a part of this specification. For a better understanding of the invention, however, and its advantages, reference should be had to the accompanying drawings and descriptive matter in which I have illustrated and described preferred embodiments of my invention.

Of the drawings:

Fig. 3 is a somewhat diagrammatic plan view of the battery shown in Fig. 1;

Fig. 4 is an enlarged sectional elevation on the line 4—4 of Fig. 3;

Figure 1:
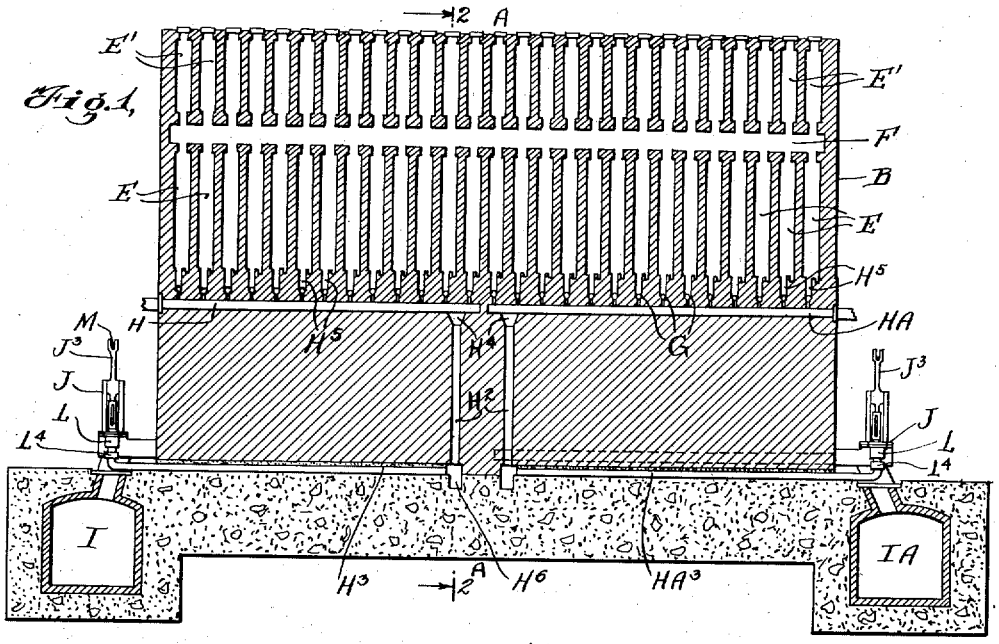
Fig. 1 is an elevation of a regenerative coke oven battery of well known type in section on the line 1—1 of Fig. 2.

In Figs. 1 to 4 inclusive of the drawings I have illustrated the application of my invention to a regenerative coke oven of well known type in which the horizontal coking chambers A are separated by heating walls B in which are formed vertical heating flues E arranged in a series extending from one end of the wall to the other. The flues E in each heating wall are connected at their upper ends by the so-called horizontal channel F. The group of flues E in each heating wall at one side of the flow reversal plane A—A which is located at, or approximately at the center of the battery, are connected by ports or passages $H^5$ to a gas supply channel H, individual to that group of flues, while the other vertical flues E in the same heating wall are connected by passages $H^5$ to a corresponding gas supply channel HA. In operation the various channels H and HA are intended to be alternately connected to a source of fuel gas by the usual piping and automatically actuated valves which are well known and hence have not been illustrated in the drawings. The flues E in each heating wall connected to a gas supply channel H are also connected by ports $D^2$ to a corresponding regenerator space or spaces D located between the oven supporting walls C, and through which air passes upward to the flues E, and is preheated during the periods in which gas is supplied to these flues E through the channels H. During the periods in which the supply of gas through the channels H is interrupted, products of combustion are sucked downward from the corresponding flues E through the ports $D^2$ into the regenerator space or spaces connected to those flues. Similarly the flues E connected to the gas supply channels HA are also connected to a regenerator space or spaces through which air flows upwardly during the periods in which gas is being supplied to the channels HA and through which products of combustion flow downward during the periods in which the supply of gas to the channel HA is interrupted.

The proper distribution of gas from each of the channels H and HA to the different flues E to which the channel is connected, is regulated by the sizes of the orifices or ports through the usual nozzles G seated one in each gas passage $H^5$. Vertical channels E normally closed at their upper ends by removable covers are provided in the top of the oven structure in line with the flues E to permit inspection and replacement of the nozzles G and to permit carbon to be punched out of the nozzle orifices if and when this may be necessary. In so far as above described the oven shown in Figs. 1 to 4 is of a standard type of construction in extensive use.

Figure 2:
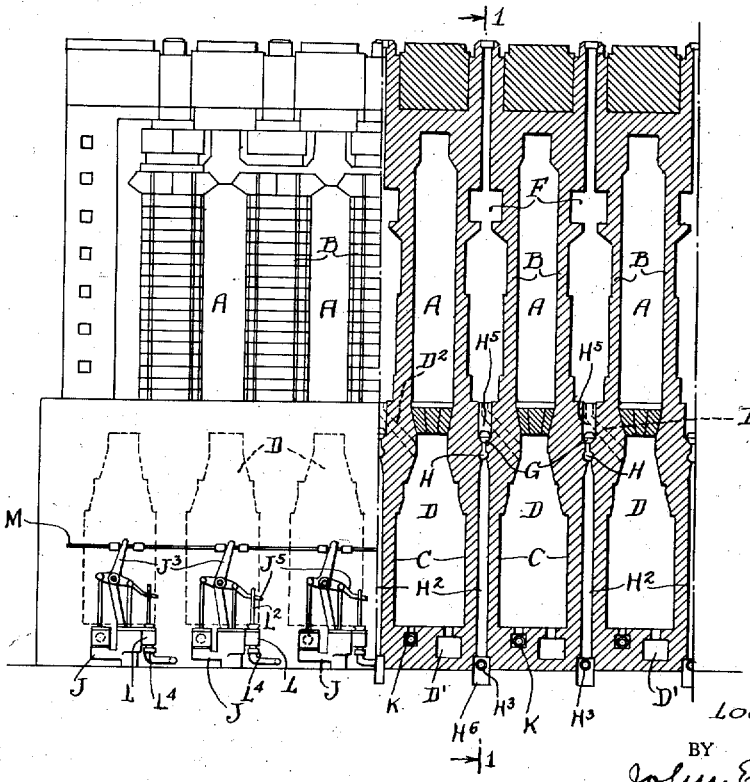
Fig. 2 is an elevation of a portion of the battery shown in Fig. 1 partly in section on the line 2—2 of Fig. 1.

In accordance with the present invention decarbonizing air is supplied to the channels H and HA at appropriate times through supply channels formed in the oven structure and leading from the sides of the battery to the inner ends of the different gas supply channels H and HA. As shown in Figs. 1 and 2, decarbonizing air is supplied to each of the channels H and HA through a corresponding vertical channel $H^2$ formed in the oven supporting wall C and connecting the corresponding gas supply channel to the inner end of a horizontal channel $H^3$ extending into the lower portion of the oven structure from the same side of the latter as the gas supply channel H or HA to which it is connected. To minimize the possibility of the channel $H^2$ becoming clogged as by broken nozzle fragments I may decrease the thickness in a direction transverse to the heating walls, of the upper end portion H of each channel $H^2$ as it approaches the corresponding gas channel, and increase its dimensions parallel to the length of the gas channel so that it opens to the latter through an elongated slot-like orifice a considerable portion of which may be clogged without material interference with the flow of decarbonizing air. To prevent difficulty from small nozzle fragments or the like falling downward through the channels $H^2$, I advantageously provide a well $H^6$ in the oven foundation at the lower end of the vertical channel $H^2$. By arranging each channel $H^2$ in vertical alignment with a flue E and passage E′ it would be possible to inspect and to punch out the upper end portion of the channel $H^2$ in case the latter became clogged, but in general I consider it preferable to arrange the channels $H^2$ out of alignment with the flues E as shown in Fig. 1 since with this arrangement, the possibility of the elongated narrow upper ends or discharge orifices of the channels $H^2$ becoming sufficiently clogged to interfere with efficient operation is very remote.

The passage of air through the channels $H^2$ and $H^3$ is controlled by suitable valves or connections at the outer ends of the channels $H^3$. In the construction shown in Figs. 1 to 4, a valve member L is provided at the outer end of each channel $H^3$, which serves, when on its seat L′, to close the outer end of the channel, and when lifted off its seat to open the outer end of the channel to the atmosphere so that atmospheric air may then be drawn into the corresponding gas supply channel H or HA. Advantageously the valve members L are operated by the same reversing mechanism employed to control the admission of air to and the discharge of products of combustion from the regenerators.

As shown in Figs. 1 to 4, each valve member L and its valve seat L′ forms part of a valve mechanism J which also includes a valve member J′ and a valve member $J^2$. The valve member J′ regulates the escape of products of combustion from, and the valve member $J^2$ regulates the admission of air to, a regenerator space or spaces of the battery. The valve members L, J′ and $J^2$ of each valve mechanism J are operated by a common valve actuating lever $J^3$. The latter is shifted in one direction to move the valve member $J^2$ into its closed position and the valve members J′ and L into their open positions, and is moved in the opposite direction to seat the valve members J′ and L, and to open the valve member $J^2$ by means of a cable M shown in Fig. 3 as running around the battery and connected at its ends to a reversing motor N placed at one end of the battery. The cable M runs over suitable guide pulleys M′ and is provided with stop collars $M^2$ for shifting the valve arms $J^3$.

As shown each valve actuating member $J^3$ is pivotally connected to the corresponding valve casing at $J^4$, and is link connected to the stems of the valve members J′ and $J^2$. Each valve actuating member $J^3$ includes a portion $J^5$ working in a slotted yoke $L^2$ secured to the upper side of the corresponding valve member L, the parts being so proportioned that notwithstanding the considerable movement given the part $J^5$ when the valve actuating member $J^3$ is moved back and forth, the valve member L will not be lifted unduly high above its seat. The valve members L drop back to their seats under the action of the gravity when permitted to do so. As a convenient means for regulating the amount of air entering the channels $H^3$, I provide in the piping connecting the outer end of each channel to the corresponding valve seat L′, a union or coupling $L^4$ in which I place a disc $L^5$ having an orifice which determines the amount of air passing through the piping when the corresponding valve member L is in its open position. To increase or decrease the rate at which air is drawn into any channel $H^3$, the corresponding measuring disc $L^5$ may be replaced by another having a larger or smaller orifice respectively.

In the contemplated mode of operation of the apparatus shown in Figs. 1 to 4, during any period or stage in operation in which gas is being supplied to the channels H, the valve members L and J′ at the left hand side of the battery will be closed while the valve members L and J′ at the right hand side of the battery will be open, and the valve members J′ at the left hand side of the battery will be in open position and at the right hand side of the battery will be closed. Under these conditions the suction of the stack or other suction producing device for drawing products of combustion down through the right hand regenerative spaces draws atmospheric air through the corresponding channels $H^2$ and $H^3$ into the gas supply channels HA and thence through the passages $H^5$ and gas nozzles G into the lower ends of the corresponding flues E from which the air and products formed by its combustion pass through the ports $D^2$ into the subjacent regenerator spaces. When the flow through the regenerators and flues is next reversed, the previously open valve members J′, $J^2$ and L are closed and the previously closed valve members J′, $J^2$ and L are opened, and atmospheric air is then drawn into the channels H. The air thus supplied to the channels H and HA burns out carbon deposited in those channels and in the corresponding ports $H^5$ and nozzles G. Since air is being supplied to each gas supply nozzle H and HA during half the time the battery is in operation the rate of air in flow may be very low, and this coupled with the manner in which the air is introduced, results in the air being heated to a comparatively high temperature before it enters the gas supply channels. I thus avoid any undesirable cooling effect on the walls of the gas channels and consequent brick fractures and gas leakage. The described mode of introduction of air into the gas supply channels and the high temperature of the air when introduced insure the proper decarbonizing effect in the inner ends of the gas supply channels and in the passages and nozzles directly connected thereto, where the greatest carbon deposition ordinarily occurs.

In respect to certain features of construction not previously referred to, and in the manner in which they are connected between the regenerative spaces with which they are associated and the tunnels or conduits at the sides of the battery the valve mechanisms J shown in Figs. 1 to 4 are of the character employed in the Wilputte as distinguished from other standard types of ovens, but the decarbonizing provisions shown in Figs. 1 to 4 are applicable to various types and designs of oven. In particular they are as applicable to an oven of the Koppers type in which the air to be preheated is drawn into the regenerators from the external atmosphere by stack suction, as to an oven of the Wilputte type in which the air to be preheated is supplied to the regenerators under pressure. In an oven of the Wilputte type there are certain advantages in supplying the decarbonizing air under pressure from the same source from which air is passed to the regenerators to be preheated therein and in Figs. 5, 6 and 7 I have illustrated means for accomplishing this.

The usual means employed in the Wilputte type of oven for supplying air to, and withdrawing products of combustion from the regenerators is shown in Figs. 1 and 4, and comprises conduits I and IA running along the opposite sides of the battery and each serving in one period of operation as an outlet for products of combustion and when the flow through the battery is reversed as an air supply conduit. As shown in Fig. 3 the conduits I and IA are alternately connected at one end of the battery to a stack or exhaust fan connection $I^5$ by the valves I′ and $I^2$. The conduits IA and I are also alternatively connected at one end of the battery by valves $I^3$ and $I^4$, respectively, to a conduit $I^6$ through which compressed air under pressure is supplied as from a blower (not shown). The valves I′, $I^2$, $I^3$ and $I^4$ are operated by a suitable reversing mechanism (not shown) so that when the valve I′ is open, the valve $I^4$ is also open and the valves $I^2$ and $I^3$ are closed and when the last mentioned valves are open, the valves I′ and $I^4$ are closed. The conduit I is connected to the corresponding regenerative spaces D between each adjacent pair of oven supporting walls C by the casing of a corresponding valve mechanism J and two channels D′ and K, the valve member J′ controlling communication between the channel D′ and the conduit I, and the valve member $J^2$ controlling communication between the channel K and the conduit I. The conduit IA is similarly connected by valve mechanisms J and channels D′ and K to the regenerative spaces D at the opposite side of the battery. The channels K thus supply air to the regenerators and the channels D′ discharge products of combustion from the regenerators.

Figure 5:
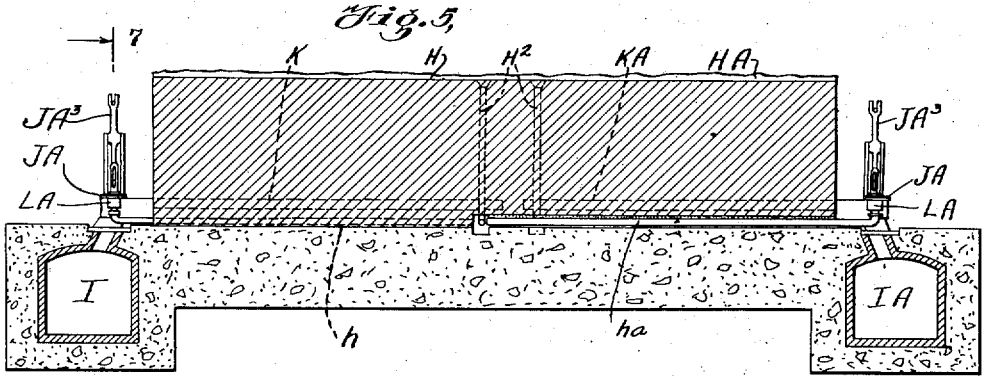
Fig. 5 is a partial sectional elevation taken similarly to Fig. 1 illustrating a modified construction.
Figure 7:
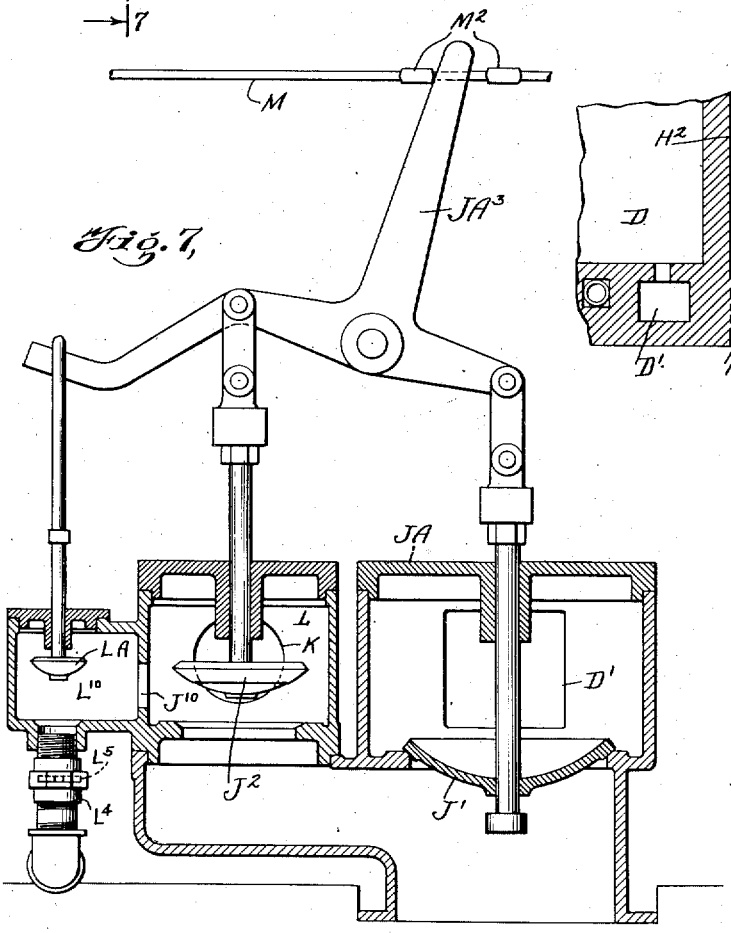
Fig. 7 is a section on the line 7—7 of Fig. 5.
Figure 6:
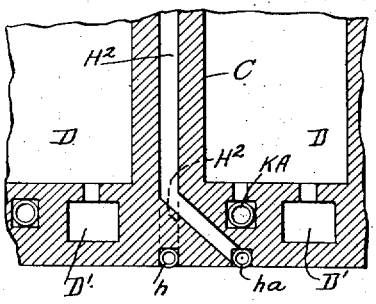
Fig. 6 is a partial section on the line 6—6 of Fig. 5.

In the modification shown in Figs. 5, 6 and 7, the gas supply channels H are supplied with decarbonizing air at the proper time from the conduit IA and the gas supply channels HA from the conduit I. For this purpose each channel $H^2$ which connects at its upper end to a gas supply channel H is connected at its lower end to a channel *ha* which runs to the right hand side of the battery, and each channel $H^2$ connected to a gas supply channel HA is connected by a passage *h* running to the left hand side of the battery. For structural reasons and to avoid leakage troubles the channels *h* and *ha* are not in alignment but are displaced as shown in Fig. 6. The valves LA of Figs. 5, 6, and 7, which replace the valves L of Figs. 1–4, serve to control the communication between the channels *h* and *ha*, and the the conduits I and IA respectively. As shown each valve LA is mounted in a valve mechanism JA which differs from the valve mechanism J in that the actuating member $JA^3$, replacing the member $J^3$ of the construction first described is arranged to open the valve members LA and $J^2$ at the same time, and in that the valve member LA works in a closed chamber $L^{10}$ communicating through a port $J^{10}$ with the chamber of the valve casing to which the corresponding regenerator air supply passage K is connected.

In practice I prefer to form the channels $H^3$, *h* and *ha* by iron pipes embedded in concrete and located at or about the level of the bottom edges of the regenerators. I prefer to form the channels $H^2$ by registering orifices in the superimposed bricks forming the walls C.

While in accordance with the provisions of the statutes I have illustrated and described the best form of embodiment in my invention now known to me, it will be apparent to those skilled in the art that changes may be made in the form of apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. In a coke oven having fuel gas supply channels extending into the oven structure from its outer surface for substantial distances, the improvement which consists in provisions for introducing decarbonizing air into said channels at points remote from said surface.

2. In a regenerative coke oven having a series of coking chambers separated by heating walls formed with flue spaces and having fuel gas supply channels each extending into the oven structure from the side of the latter and connected to the flue spaces in a heating wall at intervals along the length of the latter, the improvement which consists in provisions for introducing decarbonizing air into each of said channels at a point remote from the side of the oven structure from which the channel extends into the latter.

3. In a regenerative coke oven of the vertical flue type having fuel gas supply channels extending into the oven structure from the opposite sides of the latter approximately to the center of the oven, and having conduits at each side of the oven structure for supplying air under pressure to the oven regenerators to be preheated therein, the improvement which consists in channels and valves for intermittently connecting the gas supply channels at the one side of the oven structure to the conduits at the other side of the structure.

4. In a regenerative coke oven having coking chambers, vertically flued heating walls between the coking chambers and regenerative spaces underneath the oven chambers and having gas supply channels extending into the oven structure from its opposite sides at or about the level of the tops of the regenerative spaces, the improvement which consists in means for introducing decarbonizing air into said channels at points adjacent their inner ends comprising horizontal channels entering the oven structure at the sides of the latter and at or about the level of the bottom of the regenerative spaces and vertical channels connecting said horizontal channels to said gas supply channels.

5. In a regenerative coke oven, having combustion flues, regenerators, gas supply channels extending into the oven from the opposite sides of the latter approximately to the center of the oven, and each connected to a plurality of combustion flues, and a reversing gear for periodically reversing the direction of flow through the regenerators and flue spaces, the improvement which consists in means controlled by said reversing gear for intermittently introducing decarbonizing air into said gas channels at their inner ends.

6. In a coke oven having fuel gas supply channels extending into the oven structure from its outer surface for substantial distances, the improvement which consists in provisions for introducing decarbonizing air into said channels at points remote from said surface and comprising channels located in portions of the battery structure substantially less highly heated than are the walls of the gas supply channels.

LOUIS WILPUTTE.